(12) United States Patent
Sawamura

(10) Patent No.: US 6,416,848 B2
(45) Date of Patent: *Jul. 9, 2002

(54) RESISTANCE ELEMENT AND METHOD OF PRODUCTION OF SAME

(75) Inventor: Kentaro Sawamura, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/785,196

(22) Filed: Feb. 20, 2001

(30) Foreign Application Priority Data

Feb. 21, 2000 (JP) .................... 2000-042642

(51) Int. Cl.[7] .................. B32B 9/00; B32B 3/00; F23Q 7/00
(52) U.S. Cl. .................. 428/209; 428/697; 428/698; 428/701; 428/702; 219/260; 156/89.13; 156/89.19; 156/89.27
(58) Field of Search .................. 428/209, 469, 428/697, 698, 701, 702; 219/260; 156/89.12, 89.13, 89.14, 89.27, 89.19

(56) References Cited

U.S. PATENT DOCUMENTS

| | | | |
|---|---|---|---|
| 3,895,219 A | * 7/1975 | Richerson et al. | 219/553 |
| 4,812,298 A | * 3/1989 | Kohtoku et al. | 423/327 |
| 5,362,944 A | * 11/1994 | Hatanaka et al. | 219/270 |
| 5,997,998 A | 12/1999 | Sawamura | 428/209 |
| 6,013,898 A | * 3/2000 | Mizuno et al. | 219/270 |

FOREIGN PATENT DOCUMENTS

| | | | |
|---|---|---|---|
| EP | 0948001 A | * | 10/1999 |
| JP | A 11-288778 | | 10/1999 |
| JP | A 11-345679 | | 12/1999 |
| JP | A 2000-286039 | | 10/2000 |
| JP | A 2000-286042 | | 10/2000 |
| JP | A 2000-286043 | | 10/2000 |

* cited by examiner

*Primary Examiner*—Deborah Jones
*Assistant Examiner*—Stephen Stein
(74) *Attorney, Agent, or Firm*—Oliff & Berridge, PLC

(57) ABSTRACT

A resistance element comprising at least a resistance element body comprised of a ceramic including β-SIALON of a composition expressed by $Si_{6-z}Al_zO_zN_{8-z}$ (where, in the formula, z=0.3 to 1.0) and an internal conductor embedded inside the resistance element body, wherein the internal conductor includes a conductor material containing tungsten and carbon and having an atomic ratio of carbon to tungsten of 0.4 to 1.1 and an insulator material and the volume ratio of the insulator material to the conductor material is 0.25 to 1.5. Such a resistance element can be used over a long time under a high temperature environment, has little fluctuation in resistance even with repeated rises and falls between room temperature and a high temperature, can withstand oxidation at a high temperature, and is otherwise superior in durability.

11 Claims, 2 Drawing Sheets

RESISTANCE ELEMENT AND METHOD OF PRODUCTION OF SAME

BACKGROUND OF THE INVENTION

1. Field of the Invention

The present invention relates to a resistance element suitable for use in for example a heating element, high temperature thermistor (temperature sensor), etc. and a method of production of the same.

2. Description of the Related Art

In the past, natural gas, propane gas, kerosine, and other gaseous fuels and liquid fuels have generally been ignited by using electrifying type resistance elements made of ceramics. This type of resistance element is required to have a superior thermal shock resistance and oxidation resistance in order to withstand the rapid rise in temperature, that is, reaching a temperature of over 1000° C. in 2 to 3 seconds, and the high temperature of about 1550° C. in the air. Further, even a resistance element for a high temperature thermistor for instantaneously measuring a high temperature of over 1000° C. is required to have a superior thermal shock resistance and oxidation resistance in the same manner as such a resistance element for ignition.

To meet with this requirement, as the ceramic of the ceramic resistance element of the related art, use is made of silicon nitride due to its small thermal expansion coefficient and high strength.

A silicon nitride ceramic, however, is difficult to sinter, so a rare-earth oxide had been added as a sintering aid at the time of firing. This rare-earth has a detrimental effect on the silica film for preventing oxidation of the silicon nitride ceramic, so there was insufficient oxidation resistance of the resistance element at over 1400° C.

In the case of a resistance element used at a steady state of at least 1000° C., for example a resistance element used as a heater, the temperature of the resistance element has to be controlled by a computer etc. or else will rise excessively to about 30 to 100° C. higher than the desirable usage temperature and the element will oxidize extremely easily.

Further, in a ceramic resistance element, it is necessary to embed an internal conductor for use as the heating resistor in the ceramic. Such an internal conductor has to be fired together with the silicon nitride ceramic, so has to have a melting point of at least 1800° C. As such a conductor, tungsten, tungsten carbide, molybdenum, and chrome may be mentioned.

The thermal expansion coefficient of a silicon nitride ceramic, however, is $3 \times 10^{-6}$/° C. at 0 to 100° C., while the thermal expansion coefficients of the tungsten, tungsten carbide, molybdenum, and chrome of the internal conductor used as the resistor are all higher than that of the silicon nitride ceramic and therefore do not match it.

Therefore, a method of adding an insulating ingredient having a small thermal expansion coefficient such as silicon nitride or boronitride into the internal conductor for the purpose of reducing the difference in the thermal expansion coefficients (Japanese Unexamined Patent Publication (Kokai) No. 1995-239123) has been proposed.

If the amount of the insulating ingredient added in the internal conductor is increased to reduce the difference of the thermal expansion coefficients a bit, however, there is the problem that the resistance of the internal conductor increases and its properties deteriorate.

Further, when using tungsten or tungsten carbide as the internal conductor, part of the tungsten is silicified due to the firing process. As a result, the amount of the insulating ingredient in the internal conductor increases and there is the same sort of problem as the case of increasing the amount of addition of the insulating ingredient.

SUMMARY OF THE INVENTION

An object of the present invention is to provide a resistance element which can be used over a long time under a high temperature environment, has little fluctuation in resistance even with repeated rises and falls between room temperature and a high temperature, can withstand oxidation at a high temperature, and is otherwise superior in durability, and a method of production of the same.

The present inventors engaged in intensive studies to achieve this object and as a result discovered that by selecting a ceramic including β-SIALON (Si—Al—O—N) as the body of the resistance element or selecting a specific conductor material and insulator material as the internal conductor, it is possible to obtain a resistance element which can be used over a long time under a high temperature environment, has little fluctuation in resistance even with repeated rises and falls between room temperature and a high temperature, can withstand oxidation at a high temperature, and is otherwise superior in durability, and thereby completed the present invention.

That is, according to a first aspect of the present invention, there is a resistance element comprising at least a resistance element body comprised of a ceramic including β-SIALON of a composition expressed by $Si_{6-z}Al_zO_zN_{8-z}$ (where, in the formula, z=0.3 to 1.0) and an internal conductor embedded inside the resistance element body, wherein the internal conductor includes a conductor material containing tungsten and carbon and having an atomic ratio of carbon to tungsten of 0.4 to 1.1 and an insulator material and the volume ratio of the insulator material to the conductor material is 0.25 to 1.5.

Preferably, the insulator material included in the internal conductor contains at least one material selected from silicon nitride, sillimanite, mullite, aluminum nitride, silicon oxynitride, and SIALON.

Preferably, the ceramic of the resistance element body contains less than 0.2 mol % of a rare-earth element oxide, provided that the mol % is calculated as an equivalent mol % of the rare-earth element alone.

Preferably, the rare-earth element oxide includes at least one of yttrium oxide, lanthanum oxide, and cerium oxide.

The method of production of the resistance element of the present invention is not particularly limited, but the following method is preferably used.

According to a second aspect of the present invention, there is provided a method of production of a resistance element comprising the steps of:

forming in a predetermined pattern, on a surface of a first green sheet for forming a ceramic including β-SIALON of a composition expressed by $Si_{6-z}Al_zO_zN_{-8}$ (where, in the formula, z=0.3 to 1.0), a conductor paste for forming an internal conductor having a conductor material containing tungsten and carbon and having an atomic ratio of carbon to tungsten of 0.4 to 1.1 and an insulator material and having a volume ratio of an insulator material to the conductor material of 0.25 to 1.5;

laminating second and third green sheets of the same composition as the first green sheet on the upper and lower surfaces of the first green sheet to obtain a laminate unit; and firing the laminate unit to obtain a resistance element body.

Preferably, the laminate unit is fired in an inert gas atmosphere or a reducing atmosphere.

Preferably, the laminate unit is fired at a temperature of 1300 to 1800° C.

Preferably, the method further comprises a step of bonding external terminal electrodes through a solder material to takeout electrode portions of the internal conductor exposed at the two end faces of the resistance element body.

Preferably, the solder material is a silver solder material containing an active metal.

Preferably the external terminal electrodes are bonded by vacuum baking.

Preferably, the vacuum baking is performed at a pressure of $1.1 \times 10^{-4}$ to $8 \times 10^{-2}$ Pa and a temperature of 800 to 980° C.

The β-SIALON of the composition expressed by $Si_{6-z}Al_zO_zN_{8-z}$ (where, in the formula, z=0.3 to 1.0) of the resistance element body comprises silicon, aluminum, oxygen, and nitrogen. The silicon in the β-SIALON has a function of preventing further progress in oxidation, because the silicon can be oxidized to form a protective film comprised of a silicon oxide ($SiO_2$) film on the surface of the ceramic. Therefore, the oxidation resistance at over 1400° C. is also sufficient. If there is an alkali earth or rare-earth in the ceramic, a pure $SiO_2$ protective film is difficult to be formed and a sufficient performance as a protective film can no longer be exhibited.

In the present invention, since the β-SIALON included in the ceramic of the resistance element body comprises silicon, aluminum, oxygen, and nitrogen, at the time of use of the resistance element at a high temperature, the nitrogen diffuses out of the element body as nitrogen gas, the oxygen is used as the oxygen ingredient at the time of formation of the $SiO_2$ protective film, and therefore the formation of a pure $SiO_2$ protective layer is not inhibited. Note that aluminum promotes the densification at the time of firing, the formation of the $SiO_2$ protective film is not inhibited at the time of use of the resistance element at a high temperature, and the mechanical strength is improved.

Further, since the internal conductor includes the specific conductor material and insulator material in a specific volume ratio and they do not melt at the firing temperature of the β-SIALON, co-firing of the ceramic and internal conductor becomes possible.

Further, the thermal expansion coefficient of the specific conductor material is close to the thermal expansion coefficient of the β-SIALON. Further, the specific conductor material does not easily react with the β-SIALON.

Due to the above, according to the present invention, it is possible to provide a resistance element which (1) can be used over a long time under a high temperature environment of at least 1000° C., preferably at least 1400° C., more preferably at least 1600° C., (2) has little fluctuation in resistance even with repeated rises and falls between room temperature and a high temperature of at least 1000° C., preferably 1400° C., more preferably 1600° C., (3) can withstand oxidation at a high temperature of at least 1000° C., preferably 1400° C., more preferably 1600° C., and is otherwise superior in durability.

Preferably, since the insulator material included in the internal conductor comprises at least one material selected from silicon nitride, sillimanite, mullite, aluminum nitride, silicon oxynitride, and SIALON, not only does the difference in heat expansion between the internal conductor and the β-SIALON of the resistance element body become much smaller, but also the affinity increases and adhesion of the internal conductor into the resistance element body is improved.

The resistance element according to the present invention can be used for example as a heating element (such as ignition device), high temperature thermistor (temperature sensor), etc.

The present disclosure relates to subject matter contained in Japanese Patent Application No. 2000-42642 (filed on February 21), the disclosure of which is expressly incorporated herein by reference in its entirety.

BRIEF DESCRIPTION OF THE DRAWINGS

The above object and features of the present invention will be more apparent from the following description of the preferred embodiments given with reference to the accompanying drawings, wherein.

DESCRIPTION OF THE PREFERRED EMBODIMENTS

Below, the present invention will be explained with reference to the illustrated embodiment.

In the following explanation, the configuration of the resistance element according to the present embodiment will be explained, then the method of production of the resistance element will be explained.

Figure 1:
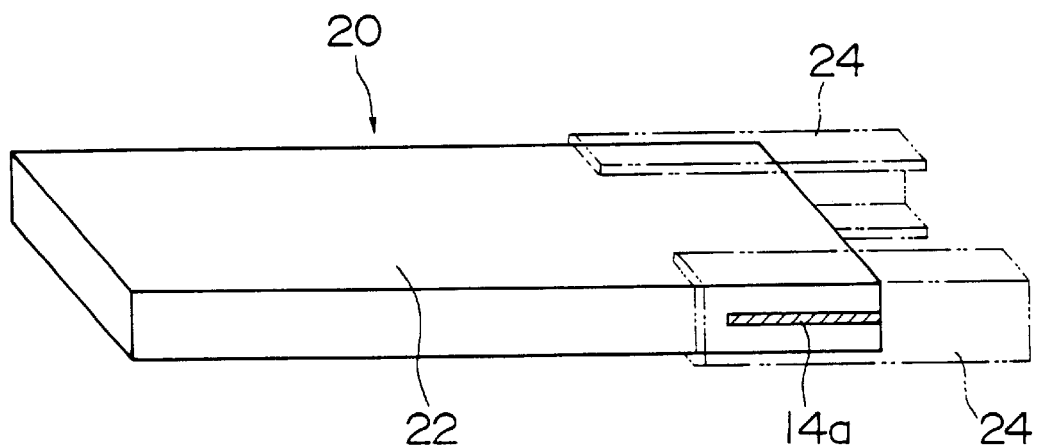
FIG. 1 is a perspective view of an embodiment of a resistance element according to the present invention and FIG. 2 is a perspective view of a process of production of the resistance element shown in FIG. 1.

Resistance Element As shown in FIG. 1, the resistance element 20 according to the present embodiment is used as for example a heating element or a high temperature thermistor (temperature sensor) and has a resistance element body 22. Inside the resistance element body 22 is formed an internal conductor 14 (see FIG. 2) of a predetermined pattern. A pair of takeout electrode portions 14a of the internal conductor 14 are formed at the two side faces of the rear of the resistance element body 22 and are bonded to external terminal electrodes 24. In the present embodiment, the material of the external terminal electrodes 24 is not particularly limited, but for example may be nickel, tungsten, molybdenum, gold, silver, copper, and combinations of the same.

Resistance Element Body 22 In the present embodiment, the resistance element body 22 is comprised of a ceramic containing β-SIALON of a composition expressed by $Si_{6-z}Al_zO_zN_{8-z}$.

The symbol z showing the molar ratio of composition in the above formula is 0.3 to 1.0, preferably 0.5 to 1.0. By making z at least 0.3, sintering can be promoted even under conditions without the addition of a rare-earth. By making z not more than 1.0, a drop in the oxidation resistance at over 1400° C. in the air is prevented while maintaining good sinterability.

Note that in the present invention, to improve the sinterability and further promote the densification, a rare-earth element oxide may be blended in the ceramic of the element body 22. In this case, the amount of the rare-earth element oxide blended is preferably less than 0.2 mol %, provided that the mol % is calculated as an equivalent mol % of the rare-earth element alone (the same hereinafter). If the rare-earth element oxide is included in an amount of 0.2 to 0.7 mol %, the oxidation resistance at over 1400° C. can be secured, but short-circuits easily occur and the lifetime tends to fall. If included in an amount of more than 0.7 mol %, the oxidation resistance tends to fall. Here, as the rare-earth element oxide, for example, an oxide of yttrium, samarium, lanthanum, cerium, neodymium, etc. may be mentioned, but preferably it is at least one of yttrium oxide, lanthanum oxide, and cerium oxide. These rare-earth element oxides may be used alone or in combinations of two or more.

Internal Conductor 14

The internal conductor 14 is comprised of a material having for example a high melting point (for example, at least 2000° C.), a low heat expansion rate (for example, not more than $6.0 \times 10^{-6}/°$ C.), and a low electrical resistance (for example, not more than $10_{-5}$ cm), but in the present embodiment is comprised of a conductor material and insulator material.

Conductor Material

The conductor material of the internal conductor 14 contains tungsten (W) and carbon (C) and has an atomic ratio of carbon to tungsten (C/W) in a predetermined range.

Since the resistance element body 22 is comprised of a ceramic including β-SIALON, if the internal conductor 14 is made of only tungsten (W), part of the conductor is silicified and a silicide of tungsten is formed at the time of firing or at the time of electrifying for heating. The silicide of tungsten is known to have a thermal expansion coefficient of over $6.0 \times 10_{-6}/°$ C. and a brittle strength. By the formation of the silicide of tungsten, the resistance easily increases and other properties deteriorate under a cycle test which repeats ON/OFF of electrification. Due to the above, in the present invention, by providing the tungsten and carbon together in a predetermined atomic ratio, the tungsten stabilizes and there is little increase in resistance or other drop in properties.

Specifically, the atomic ratio of carbon to tungsten (C/W) is 0.4 to 1.1, preferably 0.4 to 0.9.

By making the atomic ratio (C/W) at least 0.4, even in a cycle test which repeats ON/OFF of electrification, there is little increase in resistance or other drop in properties. On the other hand, if the atomic ratio (C/W) exceeds 1, that is, if there is excess carbon, solid solution is no longer possible, the carbon becomes free and the tungsten is silicified, and a drop in strength is thereby caused. Therefore, in the past, it had been thought that the limit of the ratio C/W was 1 in the controlled state. In fact, however, the internal conductor 14 has been formed by printing a paste-like material, so the organic binder used at the time of forming the paste was present in the internal conductor 14 as partial residual carbon at the time of firing and as a result the atomic ratio of carbon to tungsten became larger than 1. In view of this situation, in the past, it had been considered that the upper limit of the C/W was about 0.98 which corresponds to the amount after subtracting about 2 atomic percent of carbon.

In the present invention, as explained later, by including a predetermined amount of the insulator material with respect to the conductor material in the internal conductor 14, even if the atomic ratio is 1.1 which means an excess of carbon, a reduction in the drop in strength can be achieved and adhesion to the element body 22 can be maintained.

Insulator Material

The insulator material of the internal conductor 14 is not particularly limited in the present invention, but in the present embodiment at least one material selected from silicon nitride ($Si_3N_4$), sillimanite ($Al_2O_3.SiO_3$), mullite ($3Al_2O_3.2SiO_2$), aluminum nitride (AlN), silicon oxynitride ($Si_2ON_2$), and SIALON (α-type, β-type) is included.

These are all insulating substances, so there is no adverse effect on the resistance-temperature characteristic of the internal conductor 14 and the resistance-temperature characteristic is not impaired. Further, silicon nitride, sillimanite, mullite, aluminum nitride, and silicon oxynitride are all compounds for constituting SIALON. They do not have much of an effect on the resistance-temperature characteristic of the internal electrode 14 and improve the adhesion with the resistance element body 22, so a good reliability can be expected.

Note that silicon nitride, one compound for constituting SIALON, has a low melting point of 1713° C., so even if added, becomes fluid when firing at 1700 to 1800° C. and ends up migrating from the conductor region (internal conductor 14) to the resistance element body 22, so the effect of addition is small. Further, aluminum oxide sometimes causes a reduction in the resistance-temperature characteristic of the internal conductor 14, if too much is added, therefore is not suitable as an additive.

Volume Ratio of Conductor Material and Insulator Material

In the present invention, the volume ratio (B/A) of the insulator material (B) to the conductor material (A). for constituting the internal conductor 14 is 0.25 to 1.5, preferably 0.3 to 1.0. By making the volume ratio within the range of 0.25 to 1.5, the properties further improved in a cycle test, continuous electrifying test, or other reliability test. In particular, by making the volume ratio at least 0.25, the adhesion with the element body 22 can be improved, without effecting on the resistance-temperature characteristic of the internal conductor 14, and while by making the volume ratio not more than 1.5, the resistance-temperature characteristic of the internal conductor 14 becomes stable.

Method of Production of Resistance Element

Figure 2:
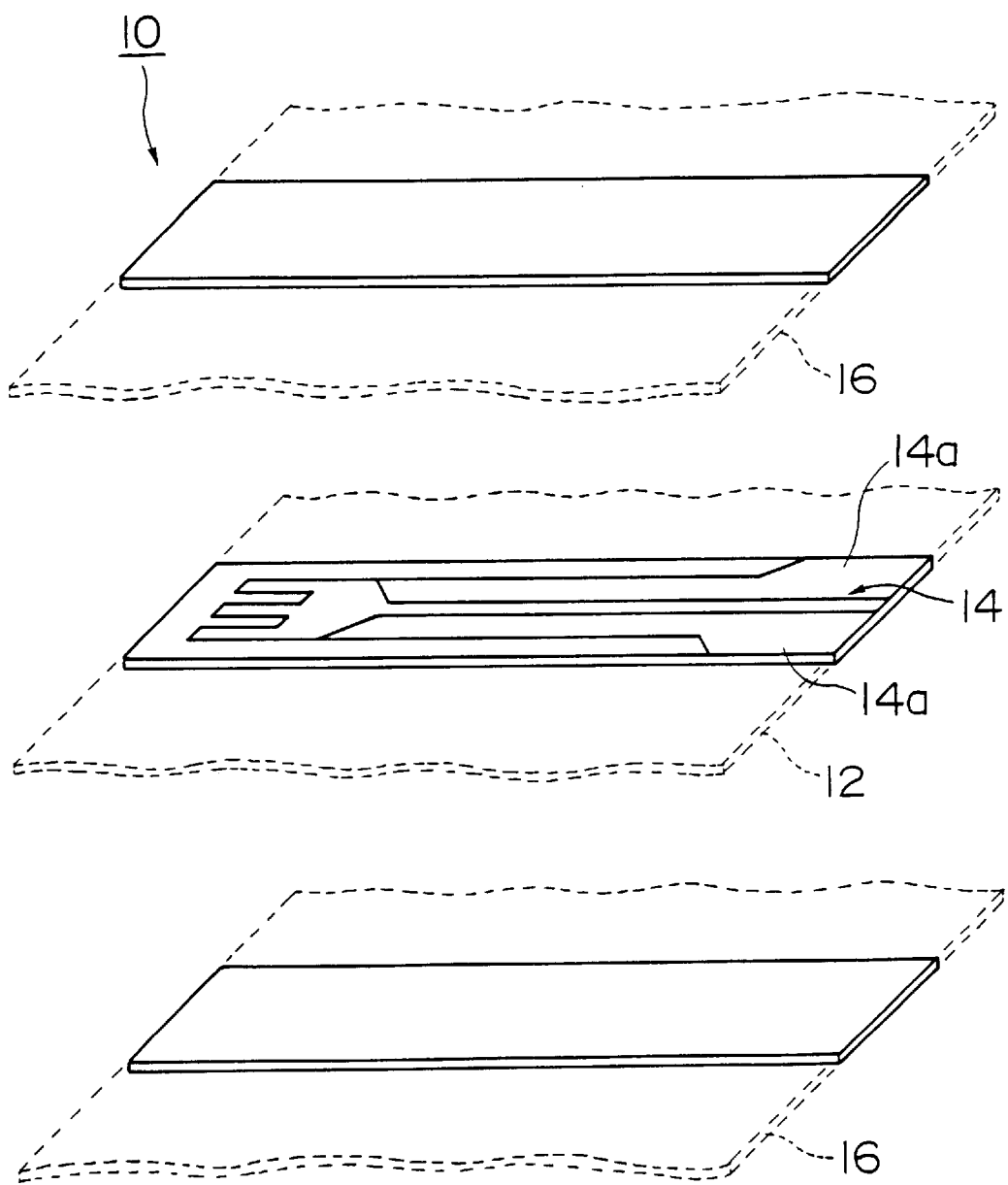

To produce the resistance element 20 of the above configuration shown in FIG. 1, first, as shown in FIG. 2, a green sheet 12 formed with internal conductors 14 on its surface in a predetermined repeating pattern by screen printing etc. and a green sheet 16 not formed with any internal conductors 14 are prepared.

In the present embodiment, each of the green sheets 12 and 16 are obtained by adding an aqueous solution or an organic solvent-based solution containing an organic binder to a β-SIALON powder to form a slurry, then forming this into a sheet and drying it. As the β-SIALON powder, use is made of a silicon nitride-aluminum oxide-aluminum nitride-based mixed powder or a silicon nitride-silicon oxide-aluminum nitride-based mixed powder etc. The particle size of the β-SIALON powder is not particularly limited, but in general is 0.1 to 1.5 μm. The binder added to the β-SIALON powder is not particularly limited, but for example may be polyvinyl alcohol, an acrylic resin, etc. As the method for forming the sheets, the doctor blade method, extrusion method, etc. may be mentioned.

The thickness of the green sheets 12 and 16 is not particularly limited, but in general is 50 to 1500 μm. The thickness of the internal conductors 14 formed by screen printing etc. on the surface of the green sheet 12 is not particularly limited, but is preferably 5 to 50 μm, more preferably 15 to 25 μm.

The conductive paste for forming the internal conductor 14 is obtained by adding an organic binder, solvent, plasticizer, etc. to a mixed powder of a predetermined volume ratio of a conductor powder with a specific atomic ratio of carbon to tungsten and an insulator powder. The particle size of the powder is not particularly limited, but is preferably 0.5 to 8 μm, more preferably 1 to 5 μm.

As shown in FIG. 2, one or more green sheets 16 are laminated on the upper and lower surfaces of the green sheet 12 formed with the pattern of the internal conductors 14 to form a laminate unit. This is then cut into individual elements.

Each of the blocks cut to the individual elements was placed in a binder-removing furnace for removal of the binder before being loaded into the ordinary pressure firing furnace. The heating temperature at the time of the processing to remove the binder differs depending on the type of the binder to be removed, but in general is 400 to 1000° C. Further, the time of the processing for removal of the binder differs depending on the size of the block or the heating temperature, but in general is several hours to tens of hours.

Next, the shaped block processed to remove the binder is set in for example an ordinary pressure firing furnace and fired.

The firing is preferably conducted in an inert gas atmosphere or reducing atmosphere to prevent oxidation of the conductor. The inert gas is not particularly limited, but is preferably nitrogen gas. Further, the first temperature is not particularly limited, but is preferably 1300 to 1800° C., more preferably 1500 to 1700° C., to produce a β-SIALON ceramic. A resistance element body 22 is obtained by this firing.

The takeout electrode portions 14a of the internal conductor 14 are exposed at the two side faces at the rear of the resistance element body 22. Next, a solder material is coated on the takeout electrode portions 14a and the external terminal electrodes 24 are attached and bonded. The bonding means is not particularly limited, but for example vacuum baking etc. is used. The vacuum baking is performed for example in a vacuum of about $1.1 \times 10^{-4}$ to $8 \times 10^{-2}$ Pa under temperature conditions of 800 to 980° C. The solder material is not particularly limited, but for example a silver solder material may be used. The silver solder material preferably includes an active metal such as titanium or zirconium. The active material is added to the solder material to ensure a sufficient bond strength to both of the zirconia ceramic of the insulating material and the internal conductor of the resistance material. If less than 1 mass % of the active material is added, the bond strength is not sufficient, while if over 5 mass %, the workability of the solder material tends to fall.

Other Embodiment

Above, an embodiment of the present invention was explained, but the present invention is not limited to this embodiment in any way. Of course, the invention may be worked in various ways within the scope of the gist of the present invention.

For example, in the above embodiment, a multi-layer type resistance element was illustrated as the resistance element, but the specific structure of the resistance element according to the present invention is not particularly limited. The resistance element may also be a wrapped type in addition to a multi-layer resistance element.

Further, in the above embodiment, the ordinary pressure firing method was used for the firing method, but the present invention is not particularly limited in the firing method. A known method, nitrogen gas pressurized firing method, etc. may be used.

Further, in the present invention, the material and the shape of the external terminal electrodes 24 are not particularly limited.

The present invention will be explained further below with reference to detailed examples, but the present invention is not limited to these examples.

EXAMPLE 1

First, an $\alpha$-$Si_3N_4$ powder, $Al_2O_3$ powder, and $AlN_2$ powder were mixed in predetermined molar ratios to give the β-SIALON of the composition expressed by $Si_{6-z}Al_zO_zN_{8-z}$ (wherein z is changed as shown in Table 1) after firing so as to prepare a β-SIALON mixed powder (however, in Sample No. 7, 0.7 mol % of $Y_2O_3$ was included in the β-SIALON mixed powder).

Next, suitable amounts of an acrylic based resin, ethanol, and toluene were added to the 100 parts by weight of each of the prepared mixed powder to prepare a slurry. The doctor blade method was used to prepare ceramic use green sheets 12 and 16 of a thickness of 0.5 mm.

Next, the surface of the green sheet 12 was screen printed with the conductor paste shown below to form a pattern of internal conductors 14. The conductor paste in the present example included an insulator material comprised of silicon nitride in a volume ratio of 1.5 with respect to the conductor material having an atomic ratio of carbon to tungsten (C/W) of 0.5.

Next, four green sheets 14 each with no pattern of internal conductors 14 formed on them at all were laminated on the upper and lower surfaces of the green sheet 12 printed with the pattern of internal conductors 14 to prepare a preliminary shaped article (laminate) of a total of nine layers.

Next, the preliminary shaped article was processed to remove the binder in a nitrogen atmosphere at 500° C., then the preliminary shaped article was set in a hot press and fired by hot pressing in a nitrogen gas atmosphere of 0.1 MPa under a pressure of 25 MPa at 1750° C. for 1 hour. After firing, the article was cut by a diamond cutter to obtain a resistance element body 22 as shown in FIG. 1.

Inside the obtained resistance element body 22 is accommodated an internal conductor 14. Tungsten-nickel electrodes (corresponding to the external terminal electrodes 24) are fired on the exposed takeout electrode portions, then were nickel plated. Further, copper wire was soldered to provide electrode terminals and obtain the resistance element 20.

The obtained resistance element 20 was used for a continuous electrifying test and a cycle test.

In the continuous electrifying test, the obtained resistance element 20 was continuously electrifyed to be held at 1600° C. and the time required for the resistance to change 10% with respect to the initial value was investigated. The initial resistance was defined as the resistance immediately after the temperature reached at 160020 C. from starting of the operation. Twenty samples each were tested and the average values employed. The results are shown in Table 1.

In the cycle test, the obtained resistance element 20 was repeatedly operated in the air for 15 seconds to raise it to 1600° C. and left idle for 15 seconds to cool it to close to room temperature and the number of cycles required for the resistance to increase 10% from the initial value (one cycle consisting of both an increase and decrease in temperature) was investigated. The initial resistance was defined as the resistance at 1600° C. at the first operation. Twenty samples each were tested and the average values were employed. The results are shown in Table 1.

TABLE 1

| Sample no. | z value | Y$_2$O$_3$ (mol %) | Continuous electrifying time (hours) | Number of cycles |
| --- | --- | --- | --- | --- |
| 1* | 0.1 | — | 4 | 329 |
| 2* | 0.2 | — | 80 | 4,580 |
| 3 | 0.3 | — | 2,000 | 167,326 |
| 4 | 0.5 | — | 15,000 up | 1,600,000 up |
| 5 | 1 | — | 10,000 | 1,228,517 |
| 6* | 2 | — | 90 | 144,453 |
| 7* | 0.2 | 0.7 | 10 | 1,020 |

C/W = 0.5,
volume ratio = 1.5,
*= comparative example.

As shown in Table 1, in the continuous electrifying test, the resistance elements with the z value of the formula Si$_{6-z}$Al$_z$O$_z$N$_{8-z}$ in the range of 0.3 to 1.0 all had lifetimes of at least 2000 hours. Their superiority compared with resistance elements with the z values outside this range could be confirmed. Note that the electrifying time was considered as "passing the test" where at least 100 hours passed in a state with a change of resistance value of not more than 10%.

Note that in Sample Nos. 1 and 2, it is considered that the lifetime (electrifying time) became short due to the failure in densification. In Sample No. 6, it is considered that the lifetime became short due to the overly large amount of aluminum and the fall in the oxidation resistance. In Sample No. 7, densification was achieved due to the effect of addition of Y, but the internal conductor short-circuited and the lifetime declined due to the migration of Y at the time of electrifying.

Further, in the cycle test, the resistance elements with the z value in the range of 0.3 to 1.0 all had durabilities of at least 150,000 cycles. Their superiority compared with resistance elements with the z values outside the above range could be confirmed. Note that the number of cycles was considered as "passing the test" where over 150,000 was reached before the change in the resistance value increased by 10%.

EXAMPLE 2

Resistance elements were prepared and evaluated under the same conditions as in Example 1 except for preparing a β-SIALON mixed powder with the symbol z of 0.8 in the formula Si$_{6-z}$Al$_z$O$_z$N$_{8-z}$ and including in the conductor paste the insulator material comprised of silicon nitride in the various volume ratio with respect to the conductor material containing carbon and tungsten in atomic ratio of carbon to tungsten (C/W) of 0.5, as shown in Table 2. The results are shown in Table 2.

TABLE 2

| Sample no. | Volume ratio | Continuous electrifying time (hours) | Number of cycles |
| --- | --- | --- | --- |
| 8* | 0.2 | 87 | 6,318 |
| 9 | 0.25 | 6,583 | 758,217 |
| 10 | 0.3 | 6,999 | 815,531 |
| 11 | 0.5 | 8,212 | 1,119,899 |
| 12 | 1 | 11,131 | 1,200,058 |
| 13 | 1.5 | 12,716 | 1,389,994 |
| 14* | 2 | — | — |

C/W = 0.5,
z = 0.8,
*= comparative example.

As shown in Table 2, in the continuous electrifying test, the resistance elements with the volume ratios of the insulator material to the conductor material in the range of 0.25 to 1.5 all had lifetimes (continuous electrifying time) of at least 6000 hours. Their superiority compared with resistance elements with volume ratios outside this range could be confirmed.

Further, in the cycle test, the resistance elements with the volume ratio of the insulator material to the conductor material in the range of 0.25 to 1.5 all had durabilities of at least 700,000 cycles. Their superiority compared with resistance elements with the volume ratios outside the above range could be confirmed. Note that the resistance element of Sample No. 14 had a small amount of conductor material, so the resistance value increased and the element failed to function as a resistance element.

EXAMPLE 3

Resistance elements were prepared and evaluated under the same conditions as in Example 1 except for preparing a β-SIALON mixed powder with the symbol z of 0.5 in the formula Si$_{6-z}$Al$_z$O$_z$N$_{8-z}$ and including in the conductor paste the insulator material comprised of silicon nitride in the volume ratio of 1.5 with respect to the conductor material in various atomic ratios of carbon to tungsten (C/W) as shown in Table 3. The results are shown in Table 3.

TABLE 3

| Sample no. | C/W (atomic ratio) | Continuous electrifying time (hours) | Number of cycles |
| --- | --- | --- | --- |
| 15* | 0.3 | 95 | 150,008 |
| 16 | 0.4 | 7,189 | 835,779 |
| 17 (=4) | 0.5 | 15,000 up | 1,600,000 up |
| 18 | 1 | 8,533 | 114,539 |
| 19 | 1.1 | 215 | 172,218 |
| 20* | 1.3 | 70 | 3,684 |

Volume ratio = 1.5,
z = 0.5,
*= comparative example.

As shown in Table 3, in a continuous electrifying test, the resistance elements with a carbon/tungsten atomic ratio in the range of 0.4 to 1.1 all had lifetimes of at least 200 hours. Their superiority compared with resistance elements with atomic ratios outside this range could be confirmed.

Further, in the cycle test, the resistance elements with the carbon/tungsten atomic ratio in the range of 0.4 to 1.1 all had durabilities of at least 170,000 cycles. Their superiority compared with resistance elements with atomic ratios outside the above range could be confirmed.

While the invention has been described by reference to specific embodiments chosen for purposes of illustration, it should be apparent that numerous modifications could be made thereto by those skilled in the art without departing from the basic concept and scope of the invention.

What is claimed is:

1. A resistance element comprising at least a resistance element body comprised of a ceramic including β-SIALON of a composition expressed by $Si_{6-z}Al_zO_zN_{8-z}$, where z=0.3 to 1.0, and an internal conductor embedded inside the resistance element body, wherein the internal conductor includes a conductor material containing tungsten and carbon and having an atomic ratio of carbon to tungsten of greater than 0.98:1 to 1.1:1 and an insulator material and a volume ratio of the insulator material to the conductor material is 0.25:1 to 1.5:1.

2. The resistance element as set forth in claim 1, wherein the insulator material included in the internal conductor contains at least one material selected from the group consisting of silicon nitride, sillimanite, mullite, aluminum nitride, silicon oxynitride, and SIALON.

3. The resistance element as set forth in claim 1, wherein the ceramic of the resistance element body contains less than 0.2 mol % of a rare-earth element oxide, provided that the mol % is calculated as an equivalent mol % of the rare-earth element alone.

4. The resistance element as set forth in claim 3, wherein the rare-earth element oxide includes at least one of yttrium oxide, lanthanum oxide, or cerium oxide.

5. A method of production of a resistance element, comprising the steps of:

forming, in a predetermined pattern on a surface of a first green sheet for forming a ceramic including β-SIALON of a composition expressed by $Si_{6-z}Al_zO_zN_{8-z}$, where z=0.3 to 1.0, a conductor paste for forming an internal conductor having a conductor material containing tungsten and carbon and having an atomic ratio of carbon to tungsten of greater than 0.98:1 to 1.1:1 and an insulator material and having a volume ratio of the insulator material to the conductor material of 0.25:1 to 1.5:1;

laminating second and third green sheets of the same composition as the first green sheet on the upper and lower surfaces of the first green sheet to obtain a laminate unit; and firing the laminate unit to obtain a resistance element body.

6. The method of production of a resistance element as set forth in claim 5, wherein the laminate unit is fired in an inert gas atmosphere or a reducing atmosphere.

7. The method of production of a resistance element as set forth in claim 5, wherein the laminate unit is fired at a temperature of 1300° C. to 1800° C.

8. The method of production of a resistance element as set forth in claim 5, further comprising a step of bonding external terminal electrodes through a solder material to takeout electrode portions of the internal conductor exposed at the two end faces of the resistance element body.

9. The method of production of a resistance element as set forth in claim 8, wherein the solder material is a silver solder material containing an active metal.

10. The method of production of a resistance element as set forth in claim 8, wherein the external terminal electrodes are bonded by vacuum baking.

11. The method of production of a resistance element as set forth in claim 10, wherein the vacuum baking is performed at a pressure of $1.1 \times 10^{-4}$ Pa to $8 \times 10^{-2}$ Pa and a temperature of 800° C. to 980° C.

* * * * *